United States Patent
Takagi et al.

(10) Patent No.: US 10,927,199 B2
(45) Date of Patent: Feb. 23, 2021

(54) CURABLE COMPOSITION AND CURED PRODUCT

(71) Applicant: AGC Inc., Chiyoda-ku (JP)

(72) Inventors: Keisuke Takagi, Chiyoda-ku (JP); Jun Yoshida, Chiyoda-ku (JP); Hidenobu Murofushi, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 0 days.

(21) Appl. No.: 15/993,002

(22) Filed: May 30, 2018

(65) Prior Publication Data

US 2018/0273656 A1   Sep. 27, 2018
US 2020/0157256 A9   May 21, 2020

Related U.S. Application Data

(63) Continuation of application No. PCT/JP2016/086594, filed on Dec. 8, 2016.

(30) Foreign Application Priority Data

Dec. 9, 2015 (JP) .............................. JP2015-240297
Jun. 7, 2016 (JP) .............................. JP2016-113687

(51) Int. Cl.

| C08F 20/14 | (2006.01) |
|---|---|
| C08F 220/22 | (2006.01) |
| C08F 292/00 | (2006.01) |
| C09C 1/36 | (2006.01) |
| C09C 3/08 | (2006.01) |
| C08F 2/48 | (2006.01) |
| C08F 20/22 | (2006.01) |
| C08F 20/28 | (2006.01) |
| C08F 20/56 | (2006.01) |
| C08F 30/08 | (2006.01) |
| C09C 1/30 | (2006.01) |

(52) U.S. Cl.
CPC ............... *C08F 20/14* (2013.01); *C08F 2/48* (2013.01); *C08F 20/22* (2013.01); *C08F 20/28* (2013.01); *C08F 20/56* (2013.01); *C08F 30/08* (2013.01); *C08F 220/22* (2013.01); *C08F 292/00* (2013.01); *C09C 1/3063* (2013.01); *C09C 1/36* (2013.01); *C09C 1/3669* (2013.01); *C09C 3/08* (2013.01); *C01P 2004/64* (2013.01)

(58) Field of Classification Search
None
See application file for complete search history.

(56) References Cited

U.S. PATENT DOCUMENTS

| 2005/0288385 A1 | 12/2005 | Kondo et al. |
| 2010/0259821 A1 | 10/2010 | Kaida et al. |
| 2011/0143282 A1 | 6/2011 | Takahashi et al. |
| 2011/0227257 A1 | 9/2011 | Kawaguchi |
| 2013/0215514 A1 | 8/2013 | Kim et al. |
| 2014/0378571 A1 | 12/2014 | Takahashi et al. |
| 2015/0148474 A1* | 5/2015 | Taira .................. G02B 1/105 524/506 |
| 2015/0253466 A1 | 9/2015 | Ibuki et al. |
| 2016/0371113 A1 | 12/2016 | Aoyama et al. |

FOREIGN PATENT DOCUMENTS

| JP | 2005-89536 | 4/2005 |
| JP | 2006-323039 | 11/2006 |
| JP | 2008-31327 | 2/2008 |
| JP | 2011-74232 | 4/2011 |
| JP | 2012-99638 | 5/2012 |
| JP | 2013-45755 | 3/2013 |
| JP | 2013-130887 | 7/2013 |
| JP | 2014-525600 | 9/2014 |
| JP | 2014-232255 | 12/2014 |
| JP | 2014-234458 | 12/2014 |
| JP | 2015-169848 | 9/2015 |
| JP | 2016-40352 | 3/2016 |
| WO | WO 2004/044062 A1 | 5/2004 |
| WO | WO 2009/041646 A1 | 4/2009 |

(Continued)

OTHER PUBLICATIONS

Hitachi Chemicals: UV-Curable Resins—HA, TA series product description for HA-7902 from internet URL;<https://www.hitachi-chem.co.jp/english/products/aprm/020.html> downloaded on Mar. 26, 2020 (Year: 2020).*

(Continued)

*Primary Examiner* — Sanza L. McClendon
(74) *Attorney, Agent, or Firm* — Oblon, McClelland, Maier & Neustadt, L.L.P.

(57) ABSTRACT

To provide a curable composition whereby it is possible to obtain a cured product having a high Abbe number and being excellent in transparency, crack resistance and releasability; and such a cured product. A curable composition comprises, in specific ratios, surface-modified metal oxide particles (A) having (meth)acryloyl-group-containing surface-modifying groups on the surface of the metal oxide particles, a compound (B) having a fluorine atom and at least one (meth)acryloyl group, a compound (C) having a urethane bond or —OCH$_2$CH(OH)CH$_2$—, having at least two (meth)acryloyl groups and having a mass-average molecular weight of at least 1,000, a compound (D) having no unsaturated bond-containing ring structure and having at least one (meth)acryloyl group, and a polymerization initiator (E).

21 Claims, No Drawings

(56) References Cited

FOREIGN PATENT DOCUMENTS

| WO | WO 2010/001976 A1 | 1/2010 |
|---|---|---|
| WO | WO 2010/064609 A1 | 6/2010 |
| WO | WO 2015/068682 A1 | 5/2015 |

OTHER PUBLICATIONS

International Search Report dated Feb. 28, 2017 in PCT/JP2016/086594, filed on Dec. 8, 2016.
U.S. Appl. No. 15/818,095, filed Nov. 20. 2017, 2018/0072830 A1, Jun Yoshida, et al.

* cited by examiner

CURABLE COMPOSITION AND CURED PRODUCT

TECHNICAL FIELD

The present invention relates to a curable composition and a cured product formed by curing the curable composition.

BACKGROUND ART

A cured product formed by curing a curable composition has such merits that (i) by an imprinting method, an injection molding method or the like, it is possible to form a cured product of a variety of shapes from a curable composition in a short time, that (ii) it is less likely to break as compared to glass and that (iii) it is light in weight as compared to glass, and thus, it has attracted attention as a material for optical members in place of glass. Heretofore, a thermoplastic resin has also been used for similar reasons, but poor yield has been pointed out due to a spool or runner in its injection molding process.

For an optical member, particularly for a lens, it may sometimes be desired to reduce the chromatic aberration. Therefore, the curable composition may sometimes be required to be one capable of obtaining a cured product having a high Abbe number.

Further, in the case of producing an optical member by an imprinting method, an injection molding method or the like, the cured product may sometimes be required to have flexibility so as not to be broken at the time of being released from the mold, and required to be easily released from the mold.

As a curable composition whereby it is possible to obtain a cured product having a high Abbe number, for example, the following one has been proposed.

(1) A curable composition comprising surface-modified silica particles having silica particles surface-treated with an alkoxysilane compound having a (meth)acryloyl group and with an alkoxysilane compound having a fluoroalkyl group, a compound having three (meth)acryloyloxy groups and having no ring structure, a compound having one (meth)acryloyloxy group and having an alicyclic structure, and a polymerization initiator (Patent Document 1).

As a curable composition whereby it is possible to obtain a cured product having both flexibility and releasability, for example, the following one has been proposed.

(2) A photocurable composition comprising a compound having at least two urethane bonds, having at least two (meth)acryloyloxy groups and having a mass average molecular weight of less than 2,000 and a viscosity at 25° C. of at most 20 Pa·s, a compound having a fluorine atom and having at least one carbon-carbon unsaturated double bond, a compound having one (meth)acryloyloxy group, a photopolymerization initiator, and a fluorinated surfactant (Patent Document 2).

PRIOR ART DOCUMENTS

Patent Documents

Patent Document 1: JP-A-2014-234458
Patent Document 2: WO2010/064609

DISCLOSURE OF INVENTION

Technical Problem

However, the curable composition of the above (1) has the following problems.

It contains surface modified silica particles in a large amount in order to increase the Abbe number of the cured product, whereby the cured product tends to be brittle, and crack resistance of the cured product is inferior.

It contains surface modified silica particles in a large amount in order to increase the Abbe number of the cured product, whereby the surface-modified silica particles tend to be hardly uniformly dispersed in the curable composition, and transparency of the cured product is low.

The cured product tends to adhere to the mold, and releasability of the cured product is poor.

Further, the cured product obtained by curing the curable composition of the above (2) has a low Abbe number, although it has flexibility and is excellent in crack resistance and excellent in releasability.

It is conceivable to combine the curable composition of the above (1) and the curable composition of the above (2), but the surface-modified silica particles in the curable composition of (1) are poor in compatibility with the compound having a urethane bond and the compound having a fluorine atom in the curable composition of (2). Therefore, still the surface-modified silica particles tend to be hardly uniformly dispersed, and transparency of the cured product is low.

The present invention is to provide a curable composition whereby it is possible to obtain a cured product having a high Abbe number and being excellent in transparency, crack resistance and releasability, and to provide such a cured product having a high Abbe number and being excellent in transparency, crack resistance and releasability.

Solution to Problem

The present invention has the following embodiments.

<1> A curable composition characterized by comprising surface-modified metal oxide particles (A) having (meth)acryloyl group-containing surface-modifying groups on the surface,
a compound (B) having a fluorine atom and at least one (meth)acryloyl group (but excluding the same one as said particles (A)),
a compound (C) having a urethane bond or —OCH$_2$CH(OH)CH$_2$—, having at least two (meth)acryloyl groups and having a mass average molecular weight of at least 1,000 (but excluding the same one as said particles (A) or said compound (B)),
a compound (D) having no unsaturated bond-containing ring structure and having at least one (meth)acryloyl group (but excluding the same one as said particles (A), said compound (B) or said compound (C)), and
a polymerization initiator (E), wherein
in 100 mass % of the total of all compounds having (meth)acryloyl groups (including said particles (A)), said particles (A) are from 20 to 45 mass %, said compound (B) is from 0.01 to 20 mass %, said compound (C) is from 10 to 50 mass % and said compound (D) is from 10 to 50 mass %, and
to 100 parts by mass of the total of all compounds having (meth)acryloyl groups (including said particles (A)), said polymerization initiator (E) is from 0.01 to 10 parts by mass.

<2> The curable composition according to <1>, wherein the (meth)acryloyl group-containing surface modifying groups have a group represented by the following formula (A1),

wherein * is a bond of Si, $R^1$ is a hydrogen atom or a methyl group, $R^2$ is a hydrogen atom or a $C_{1-4}$ hydrocarbon group, X is —O— or —NH—, a is an integer of from 2 to 7, and b is an integer of from 0 to 2, provided that when b is 2, the two $R^2$ may be the same or different.

<3> The curable composition according to <1> or <2>, wherein metal oxide particles of the surface-modified metal oxide particles (A) are silica particles.

<4> The curable composition according to any one of <1> to <3>, wherein the median diameter of the surface-modified metal oxide particles (A) is from 1 to 1,000 nm.

<5> The curable composition according to any one of <1> to <4>, wherein the compound (B) is a fluoro(meth)acrylate.

<6> The curable composition according to any one of <1> to <5>, wherein the compound (C) is a compound (C1) having a urethane bond and having at least two (meth) acryloyl groups, or a compound (C2) having —OCH$_2$CH (OH)CH$_2$— and having at least two (meth)acryloyl groups.

<7> The curable composition according to <6>, wherein the compound (C1) is a compound represented by the following formula (C11),

$$\{(CH_2=CR^{11}C(O)O—)_i\text{J-OC(O)NH—}\}_k Q \quad (C11)$$

wherein $R^{11}$ is a hydrogen atom or a methyl group, i is 1 or 2, J is a (i+1)-valent organic group, and Q is a k-valent organic group.

<8> The curable composition according to <6>, wherein the compound (C2) is a compound represented by the following formula (C21),

$$CH_2=CR^{21}C(O)O—CH_2CH(OH)CH_2—(O)_s—\}_t G \quad (C21)$$

wherein $R^{21}$ is a hydrogen atom or a methyl group, s is 0 or 1, t is an integer of at least 2, and G is a t-valent organic group.

<9> The curable composition according to any one of <1> to <8>, wherein the compound (D) is a compound (D1) having no unsaturated bond-containing ring structure and having one (meth)acryloyloxy group (but excluding the same one as the particles (A), the compound (B) or the compound (C)), or a compound (D2) having no unsaturated bond-containing ring structure and having at least two (meth)acryloyloxy groups (but excluding the same one as the particles (A), the compound (B) or the compound (C)).

<10> The curable composition according to <9>, wherein the compound (D1) is an acrylic acid ester or a methacrylic acid ester.

<11> The curable composition according to <9>, wherein the compound (D2) is a (meth)acrylate of a diol, a (meth) acrylate of a triol, or a tetraol (meth)acrylate.

<12> The curable composition according to any one of <1> to <11>, wherein the polymerization initiator (E) is a photoradical polymerization initiator.

<13> The curable composition according to any one of <1> to <12>, which contains a solvent containing at least one member selected from the group consisting of an ester, a ketone, a hydroxyl group and an ether.

<14> The curable composition according to any one of <1> to <13>, which has a viscosity at 25° C. of from 100 to 15,000 mPa·s.

<15> A cured product formed by curing the curable composition as defined in any one of <1> to <14>.

Advantageous Effects of Invention

According to the curable composition of the present invention, it is possible to obtain a cured product having a high Abbe number and being excellent in transparency, crack resistance and releasability. The cured product of the present invention has a high Abbe number and is excellent in transparency, crack resistance and releasability.

DESCRIPTION OF EMBODIMENTS

In this specification, a compound represented by the formula (A10) will be referred to also as a compound (A10). Compounds represented by other formulae will also be referred to in the same manner.

A "(meth)acryloyl group" is a general term for an acryloyl group and a methacryloyl group.

A "(meth)acrylate" is a general term for an acrylate and a methacrylate.

A "(meth)acrylic acid" is a general term for acrylic acid and methacrylic acid.

A "light" is a general term for ultraviolet light, visible light, infrared light, electron beam and radiation.

<Curable Composition>

The curable composition of the present invention comprises, as essential components, the surface-modified metal oxide particles (A), the compound (B), the compound (C), the compound (D) and the polymerization initiator (E).

The curable composition of the present invention may contain additives, a solvent, etc., as the case requires.

The viscosity at 25° C. of the curable composition of the present invention is preferably from 100 to 15,000 mPa·s, more preferably from 1,000 to 12,000 mPa·s. When the viscosity of the curable composition is within the above range, it is possible to easily contact the curable composition to an imprinting mold or to easily inject it into an injection molding mold without carrying out a special operation (such as an operation to heat the curable composition to a high temperature to let it have a low viscosity). Further, the curable composition can be easily applied to the surface of a substrate without permitting the curable composition to flow out from the surface of the substrate.

(Surface-Modified Metal Oxide Particles (A))

The surface-modified metal oxide particles (A) are ones having (meth)acryloyl group-containing surface modifying groups on the surface of metal oxide particles.

The metal oxide particles may be silica particles, zirconia particles, titania particles, barium titanate particles, cerium oxide particles, alumina particles, indium-doped tin oxide (ITO) particles, etc. Among them, silica particles, zirconia particles or titania particles excellent in handling efficiency and having good compatibility with the composition, are preferred, and silica particles having a high Abbe number are more preferred.

The median diameter of metal oxide particles prior to the surface-modification is preferably from 1 to 1,000 nm, more preferably from 1 to 100 nm. When the median diameter is at least the above lower limit value, handling efficiency will be good, and primary particles are less likely to aggregate and can easily be monodispersed. When the median diameter is at most the above upper limit value, transparency of the cured product will be more excellent. The median diameter of the metal oxide particles is obtained by using a particle size distribution measuring apparatus by a dynamic light scattering method.

A (meth)acryloyl group-containing surface modifying group has a (meth)acryloyl group at the terminal and further has a connecting group to connect the (meth)acryloyl group and a metal oxide particle.

As the (meth)acryloyl group-containing surface modifying groups, from the viewpoint of good compatibility with other components and from such a viewpoint that surface-modified metal oxide particles (A) tend to be easily uniformly dispersible in the curable composition and transparency of the cured product will be further excellent, preferred are surface modifying groups having a group represented by the following formula (A1).

$$CH_2=CR^1C(O)-X-(CH_2)_a-SiR^2{}_b(-*)_{3-b} \quad (A1)$$

* is a bond of Si.

$R^1$ is a hydrogen atom or a methyl group.

$R^2$ is a hydrogen atom or a hydrocarbon group having from 1 to 4 carbon atoms. The hydrocarbon group is preferably an alkyl group, more preferably an alkyl group having a straight chain. As the alkyl group, from the viewpoint of handling efficiency of the later-described compound (A10), preferred is a methyl group or an ethyl group, and from the viewpoint of availability of the compound (A10), particularly preferred is a methyl group.

X is —O— or —NH—, and from the viewpoint of availability of the compound (A10), —O— is particularly preferred.

a is, from the viewpoint of compatibility with the compound (B), an integer of from 2 to 7, preferably an integer of from 2 to 6, and from the viewpoint of availability of the compound (A10), most preferably 3.

b is an integer of from 0 to 2, from the viewpoint of the reactivity of the compound (A10), preferably an integer of from 0 to 1, particularly preferably 0. When b is 2, the two R may be the same or different.

Examples of the group represented by the formula (A1) include the following groups.

$CH_2=C(CH_3)C(O)O(CH_2)_3Si(CH_3)(-*)_2$,
$CH_2=C(CH_3)C(O)O(CH_2)_3Si(-*)_3$,
$CH_2=CHC(O)O(CH_2)_3Si(-*)_3$,
$CH_2=C(CH_3)C(O)NH(CH_2)_3Si(-*)_3$,
$CH_2=CHC(O)NH(CH_2)_3Si(-*)_3$, etc.

The surface-modified metal oxide particles (A) are obtainable by surface treating the surface of metal oxide particles with a silane coupling agent having a (meth)acryloyl group.

As the silane coupling agent having a (meth)acryloyl group, compound (A10) is preferred, from such a viewpoint that compatibility of the surface-modified metal oxide particles (A) with other components will be good, the surface-modified metal oxide particles (A) tend to be easily uniformly dispersed in the curable composition and transparency of cured product will be further excellent.

$$CH_2=CR^1C(O)-X-(CH_2)_a-SiR^2{}_b(OR^3)_{3-b} \quad (A10)$$

$R^1$, $R^2$, X, a and b are as defined in the formula (A1).

$R^3$ is a hydrogen atom or a hydrocarbon group having from 1 to 10 carbon atoms. The hydrocarbon group is preferably an alkyl group, more preferably an alkyl group having a straight chain. As the alkyl group, from the viewpoint of handling efficiency of the compound (A10) and availability of the compound (A10), a methyl group or an ethyl group is preferred. When b is 0 or 1, three or two $R^3$ may be the same or different.

The compound (A10) may be 3-methacryloyloxypropyl methyl dimethoxysilane, 3-methacryloyloxypropyl trimethoxysilane, 3-methacryloyloxypropyl methyl diethoxysilane, 3-methacryloyloxypropyl triethoxysilane, 3-acryloyloxypropyl trimethoxysilane, 3-(isopropenyl carbonylamino) propyl trim ethoxysilane, 3-(vinyl carbonylamino) propyl trimethoxysilane, etc.

As the compound (A10), one type may be used alone, or two or more types may be used in combination.

The median diameter of the surface-modified metal oxide particles (A) is preferably from 1 to 1,000 nm, more preferably from 1 to 100 nm. When the median diameter is at least the above lower limit value, the handling efficiency will be good and primary particles are less likely to aggregate and tend to be easily monodispersed. When the median diameter is at most the above upper limit value, transparency of the cured product will be more excellent.

The median diameter of the surface-modified metal oxide particles (A) is obtained by using a particle size distribution measuring apparatus by a dynamic light scattering method.

Commercially available products of the surface-modified metal oxide particles (A) may be organosilica sols (such as MEK-AC-2140Z, MEK-AC-4130Y, MEK-AC-5140Z, PGM-AC-2140Y, PGM-AC-4130Y, MIBK-AC-2140Z) manufactured by Nissan Chemical Industries, Ltd., ADELITE AT manufactured by ADEKA Corporation, ELCOM V-8802, V-8804, manufactured by JGC Catalysts & Chemicals Co., Ltd., etc. As the surface-modified metal oxide particles (A), one type may be used alone, or two or more types may be used in combination.

(Compound (B))

The compound (B) is one having a fluorine atom and having at least one (meth)acryloyl group (but excluding the same one as the surface-modified metal oxide particles (A)).

As the compound (B), a fluoro(meth)acrylate is preferred from the viewpoint of compatibility with other components.

As the fluoro(meth)acrylate, the following compounds may be mentioned.

$CH_2=CHC(O)OCH_2CH(OH)CH_2CF_2CF_2CF(CF_3)_2$,
$CH_2=C(CH_3)C(O)OCH_2CH(OH)CH_2CF_2CF_2CF(CF_3)_2$,
$CH_2=CHC(O)OCH(CF_3)_2$,
$CH_2=C(CH_3)C(O)OCH(CF_3)_2$,
$CH_2=CHC(O)O(CH_2)_2(CF_2)_{10}F$,
$CH_2=CHC(O)O(CH_2)_2(CF_2)_8F$,
$CH_2=CHC(O)O(CH_2)_2(CF_2)_6F$,
$CH_2=C(CH_3)C(O)O(CH_2)_2(CF_2)_{10}F$,
$CH_2=C(CH_3)C(O)O(CH_2)_2(CF_2)_8F$,
$CH_2=C(CH_3)C(O)O(CH_2)_2(CF_2)_6F$,
$CH_2=CHC(O)OCH_2(CF_2)_6F$,
$CH_2=C(CH_3)C(O)OCH_2(CF_2)_6F$,
$CH_2=CHC(O)OCH_2(CF_2)_7F$,
$CH_2=C(CH_3)C(O)OCH_2(CF_2)_7F$,
$CH_2=CHC(O)OCH_2CF_2CF_2H$,
$CH_2=CHC(O)OCH_2(CF_2CF_2)_2H$,
$CH_2=CHC(O)OCH_2(CF_2CF_2)_4H$,
$CH_2=C(CH_3)C(O)OCH_2CF_2CF_2H$,
$CH_2=C(CH_3)C(O)OCH_2(CF_2CF_2)_2H$,
$CH_2=C(CH_3)C(O)OCH_2(CF_2CF_2)_4H$,
$CH_2=CHC(O)OCH_2CF_2OCF_2CF_2OCF_3$,
$CH_2=CHC(O)OCH_2CF_2O(CF_2CF_2O)_3CF_3$,
$CH_2=C(CH_3)C(O)OCH_2CF_2OCF_2CF_2OCF_3$,
$CH_2=C(CH_3)C(O)OCH_2CF_2O(CF_2CF_2O)_3CF_3$,
$CH_2=CHC(O)OCH_2CF(CF_3)OCF_2CF(CF_3)O(CF_2)_3F$,
$CH_2=CHC(O)OCH_2CF(CF_3)O(CF_2CF(CF_3)O)_2(CF_2)_3F$,
$CH_2=C(CH_3)C(O)OCH_2CF(CF_3)\quad OCF_2CF(CF_3)O(CF_2)_3F$,
$CH_2=C(CH_3)C(O)OCH_2CF(CF_3)O(CF_2CF(CF_3)O)_2(CF_2)_3F$,
$CH_2=CFC(O)OCH_2CH_2(OH)CH_2(CF_2)_6CF(CF_3)_2$,
$CH_2=CFC(O)OCH_2CH(CH_2OH)CH_2(CF_2)_6CF(CF_3)_2$,
$CH_2=CFC(O)OCH_2CH(OH)CH_2(CF_2)_{10}F$,
$CH_2=CFC(O)OCH_2CH(CH_2OH)CH_2(CF_2)_{10}F$,
$CH_2=CHC(O)OCH_2CF_2(OCF_2C_2)_pOCF_2CH_2OC(O)$
$\quad CH=CH_2$ (wherein p is an integer of from 1 to 20), $CH_2=C(CH_3)C(O)OCH_2CF_2(OCF_2CF_2)_pOCF_2CH_2OC(O)C(CH_3)=CH_2$ (wherein p is an integer of from 1 to 20), $CH_2=CHC(O)OCH_2(CF_2)_4CH_2OC(O)CH=CH_2$, $CH_2=C(CH_3)C(O)OCH_2(CF_2)_4CH_2OC(O)C(CH_3)=CH_2$, etc.

As the compound (B), one type may be used alone, or two or more types may be used in combination.

(Compound (C))

The compound (C) is a compound (C1) having a urethane bond and at least two (meth)acryloyl groups, or a compound (C2) having $-OCH_2CH(OH)CH_2-$ and having at least two (meth)acryloyl groups (but excluding the same one as the surface-modified metal oxide particles (A) or the compound (B)).

The number of urethane bonds or $-OCH_2CH(OH)CH_2-$ is preferably an integer of from 2 to 4, particularly preferably 2, with a view to imparting flexibility by hydrogen bonding between molecules or within molecules.

The number of (meth)acryloyl groups is preferably an integer of 2 to 4, particularly preferably 2, from such a viewpoint that cracking due to curing shrinkage tends to be less likely to occur.

The mass average molecular weight of the compound (C) is at least 1,000, preferably from 1,000 to 30,000, more preferably from 1,000 to 20,000. When the mass average molecular weight is at least the above lower limit value, flexibility of the cured product will be good, and crack resistance of the cured product will be excellent. When the mass average molecular weight is at most the above upper limit value, compatibility with other components will be good and transparency of the cured product will be more excellent.

The mass average molecular weight of the compound (C) is a value obtained as calculated as polystyrene using a GPC system.

The viscosity at 25° C. of the compound (C) is preferably at least 2,000 mPa·s, more preferably from 2,500 to 500,000 mPa·s, further preferably from 3,000 to 300,000 mPa·s. When the viscosity is at least the above lower limit value, flexibility of the cured product will be good, and crack resistance of the cured product will be more excellent. When the viscosity is at most the above upper limit value, compatibility with other components will be good, and transparency of the cured product will be more excellent.

The compound (C1) is, for example, obtained by reacting a (meth)acrylate having a hydroxy group to a compound having at least two isocyanate groups.

As the compound (C1), a compound (C11) is preferred, since the flexibility of the cured product will be good, and the crack resistance of the cured product will be further excellent.

$\{(CH_2=CR^{11}C(O)O-)_iJ-OC(O)NH-\}_kQ$ (C11)

In the formula (11), $R^{11}$ is a hydrogen atom or a methyl group. i is 1 or 2. J is a (i+1)-valent organic group. A divalent organic group may be an alkylene group having from 2 to 10 carbon atoms, $-(C_2H_4O)_j-C_2H_4-$, $-(C_3H_6O)_j-C_3H_6-$ (wherein j is an integer of from 1 to 29), etc. A trivalent organic group may be $(-CH_2)_2CR^{12}-$ (wherein $R^{12}$ is a hydrogen atom or a methyl group), etc. k is an integer of from 2 to 4, particularly preferably 2.

Q is a k-valent organic group. As the k-valent organic group, a k-valent hydrocarbon group is preferred. Q may be any one of a group having an aliphatic structure, a group having an alicyclic structure and a group having an aromatic ring structure, and from such a viewpoint that compatibility with other components will be good and transparency of the cured product will be more excellent, preferred is a group having an aliphatic structure or a group having an alicyclic structure, and more preferred is an alkylene group having from 2 to 10 carbon atoms or a divalent hydrocarbon group having from 5 to 12 carbon atoms and having an alicyclic structure.

Commercial products of the compound (C1) may be NK Oligo (UA-160TM, U-412A, UA-4200, UA-4400, UA-122P, etc.) manufactured by Shin-Nakamura Chemical Co., Ltd., EBECRYL (8402, 8807, 9260, etc.) manufactured by DAICEL-ALLNEX LTD., KRM (8667, 8904, etc.) manufactured by DAICEL-ALLNEX LTD., UA-306H, UA-306T, UA-3061, UA-510H manufactured by Kyoeisha Chemical Co., Ltd., UX-3204, UX-4101, UX-8101 manufactured by Nippon Kayaku Co., Ltd., etc.

The compound (C2) may be obtained, for example, by reacting (meth)acrylic acid to a compound having at least two glycidyl groups.

The compound having at least two glycidyl groups may be bisphenol A diglycidyl ether, bisphenol F diglycidyl ether, ethylene glycol diglycidyl ether, 1,4-butanediol diglycidyl ether, neopentyl glycol diglycidyl ether, 1,6 hexanediol diglycidyl ether, propylene glycol diglycidyl ether, trimethylolethane triglycidyl ether, trimethylolpropane triglycidyl ether, hydrogenated bisphenol A diglycidyl ether, etc.

As the compound (C2), a compound (C21) is preferred from such a viewpoint that flexibility of the cured product will be good, and crack resistance of the cured product will be further excellent.

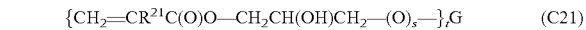

$\{CH_2=CR^{21}C(O)O-CH_2CH(OH)CH_2-(O)_s-\}_tG$ (C21)

In the formula (C21), $R^{21}$ is a hydrogen atom or a methyl group. s is 0 or 1. t is an integer of at least 2, particularly preferably from 2 to 3. G is a t-valent organic group. As the t-valent organic group, a t-valent hydrocarbon group is preferred. G may be any of a group having an aliphatic structure, a group having an alicyclic structure and a group having an aromatic ring structure.

Commercial products of the compound (C2) may be NK Oligo (EA-1010, EA-102S, EA-1020, EA-5520, EA-5323, EA-5311, EA-6320, EA-6340, etc.) manufactured by Shin Nakamura Chemical Co., Ltd., R-381 manufactured by Nippon Kayaku Co., Ltd., EBECRYL (860, 3708, etc.) manufactured by DAICEL-ALLNEX LTD., MiramerEA2280 manufactured by Toyo Chemicals Co. Ltd., epoxy esters (3002M(N), 3002A(N), 3000MK, 3000A, etc.) manufactured by Kyoeisha Chemical Co., Ltd., epoxy acrylates (BAEA-100, BFEA-50, HPEA-100, PNEM-100, etc.) manufactured by KSM CO., LTD., etc. As the compound (C), one type may be used alone, or two or more types may be used in combination.

(Compound (D))

The compound (D) is one having no unsaturated bond-containing ring structure and having at least one (meth)acryloyl group (but excluding the particles (A), the compound (B) or the compound (C)). An unsaturated bond-containing ring structure tends to reduce the Abbe number of the cured product, and therefore, it should better be not contained as much as possible in the cured product. As the unsaturated bond-containing ring structure, a benzene ring, a naphthalene ring, an anthracene ring, a furan ring, a pyrrole ring, a pyridine ring, an imidazole ring, a thiophene ring, etc. may be mentioned. Among them, a condensed ring such as naphthalene ring or an anthracene ring should better be not contained, since it tends to more reduce the Abbe number.

As the compound (D), preferred is one having a $C_{1-30}$ organic group bonded to a (meth)acryloyl group via an oxygen atom. The number of carbon atoms in the organic group is preferably from 4 to 20, more preferably from 4 to 12.

The organic group may be a straight-chain alkyl group, a branched alkyl group, a cycloalkyl group, an allyl group, a bridged hydrocarbon group, or a group having a repeating structure of oxyalkylene chains. Such a group may be one wherein part of the carbon atoms may be substituted by a hetero atom such as a nitrogen atom, oxygen atom, etc. or by a silicon atom, or part of the hydrogen atoms may be substituted by a functional group such as a hydroxy group, an amino group, etc., or it may have an unsaturated bond or a free carboxy group. As the organic group, preferred is a straight-chain alkyl group, a branched alkyl group, a cycloalkyl group or a bridged hydrocarbon group.

The compound (D) may be a compound (D1) having no unsaturated bond-containing ring structure and having one (meth)acryloyloxy group (but excluding the same one as the particles (A), the compound (B) or the compound (C)), or a compound (D2) having no unsaturated bond-containing ring structure and having at least two (meth)acryloyloxy groups (but excluding the same one as the particles (A), the compound (B) or the compound (C)).

As the compound (D1), an acrylic acid ester or a methacrylic acid ester is preferred. As the compound (D1), the following compounds may be mentioned.

2-Ethylhexyl (meth)acrylate, butyl (meth)acrylate, ethoxyethyl (meth)acrylate, methoxyethyl (meth)acrylate, allyl (meth)acrylate, 2-hydroxyethyl (meth)acrylate, 2-hydroxypropyl (meth)acrylate, octyl (meth)acrylate, decyl (meth)acrylate, n-butyl (meth)acrylate, tert-butyl (meth)acrylate, behenyl (meth)acrylate, stearyl (meth)acrylate, isostearyl (meth)acrylate, lauryl (meth)acrylate, glycidyl (meth)acrylate, tetrahydrofurfuryl (meth)acrylate, 2-methyl-2-adamantyl (meth)acrylate, 2-ethyl-2-adamantyl (meth)acrylate, 3-hydroxy-1-adamantyl (meth)acrylate, 1-adamantyl (meth)acrylate, isobornyl (meth)acrylate, 4-tert-butylcyclohexyl (meth)acrylate, 3-(trimethoxysilyl) propyl (meth)acrylate, N,N-diethylaminoethyl (meth)acrylate, N,N-dimethylaminoethyl (meth)acrylate, (2-(tert-butylamino)ethyl (meth)acrylate, methoxy triethylene glycol (meth)acrylate, methoxy polyethylene glycol (meth)acrylate, 2-(meth)acryloyloxyethyl hexahydrophthalic acid, 2-(meth)acryloyloxyethyl succinic acid, 1,2,2,6,6-pentamethyl-4-piperidyl (meth)acrylate, etc.

As the compound (D2), preferred is a (meth)acrylate of a diol (such as glycol), a (meth)acrylate of a triol (such as glycerol or trimethylol), or a (meth)acrylate of a tetraol (such as pentaerythritol). As the compound (D2), the following compounds may be mentioned.

A polyoxyethylene glycol di(meth)acrylate (ethylene glycol di(meth)acrylate, diethylene glycol di(meth)acrylate, tetraethylene glycol di(meth)acrylate, etc.), a polypropylene glycol di(meth)acrylate (dipropylene glycol di(meth)acrylate, etc.), 1,3-butanediol di(meth)acrylate, 1,4-butanediol di(meth)acrylate, glycerol 1,3-diglycerolate di(meth)acrylate, 1,6-hexanediol ethoxylate di(meth)acrylate, 1,6-hexanediol propoxylate di(meth)acrylate, 1,6-hexanediol di(meth)acrylate, 3-hydroxy-2,2-dimethyl-propionate di(meth)acrylate, 1,9-nonanediol di(meth)acrylate, 1,10-decanediol di(meth)acrylate, neopentyl glycol di(meth)acrylate, neopentyl glycol propoxylate di(meth)acrylate, glycerol di(meth)acrylate, propylene glycol glycerolate di(meth) acrylate, tripropylene glycol di(meth)acrylate, triethylene glycol di(meth)acrylate, tetraethylene glycol di(meth)acrylate, tripropylene glycol glycerolate di(meth)acrylate, 2-hydroxy-3-acryloyloxypropyl (meth)acrylate, 2-methyl-1,3-propanediol diacrylate, tricyclodecane dimethanol diacrylate, trimethylolpropane tri(meth)acrylate, trimethylolpropane ethoxy tri(meth)acrylate, ethoxylated trimethylolpropane triacrylate, propoxylated trimethylolpropane triacrylate, 1,3-bis(3-methacryloyloxy propyl)-1,1,3,3-tetramethyldisiloxane, glycerol propoxy tri(meth)acrylate, pentaerythritol di(meth)acrylate monostearyl acid, trimethylolpropane ethoxylate methyl ether di(meth)acrylate, pentaerythritol tetra(meth)acrylate, pentaerythritolethoxy tetra(meth)acrylate, ditrimethylolpropane tetra(meth)acrylate, propoxylated pentaerythritol tetraacrylate, dipentaerythritol hexa(meth)acrylate, etc.

As the compound (D), one type may be used alone, or two or more types may be used in combination.

(Polymerization Initiator (E))

The polymerization initiator (E) is suitably selected depending on the curing method (photo-curing or heat-curing), etc.

As the polymerization initiator (E), a photopolymerization initiator or a thermal polymerization initiator may be mentioned. As the polymerization initiator (E), a photopolymerization initiator is preferred in that it is thereby easy to produce a cured product.

As the photopolymerization initiator, a photoradical polymerization initiator to generate radicals by absorbing light may, for example, be mentioned. As the photopolymerization initiator, from such a viewpoint that it is thereby easy to prepare a cured product, a photoradical polymerization initiator is preferred.

The photoradical polymerization initiator may be an alkylphenone-type photopolymerization initiator, an acylphosphine oxide-type photopolymerization initiator, a titanocene-type photopolymerization initiator, an oxime ester-type photopolymerization initiator, an oxyphenyl acetic acid ester-type photopolymerization initiator, a benzoin-type photopolymerization initiator, a benzophenone-type photopolymerization initiator, a thioxanthone-type photopolymerization initiator, benzyl-(o-ethoxycarbonyl)-α-monooxime, glyoxy ester, 3-ketocoumarin, 2-ethyl anthraquinone, camphorquinone, tetramethylthiuram sulfide, azobisisobutyronitrile, benzoyl peroxide, a dialkyl peroxide, tert-butyl peroxypivalate, etc. From the viewpoint of sensitivity and compatibility, an alkyl phenone-type photopolymerization initiator, an acylphosphine oxide-type photopolymerization initiator, a benzoin-type photopolymerization initiator or a benzophenone-type photopolymerization initiator is preferred. As the photopolymerization initiator, one type may be used alone, or two or more types may be used in combination.

The thermal polymerization initiator may be 2,2'-azobisisobutyronitrile, benzoyl peroxide, tert-butyl hydroperoxide, cumene hydroperoxide, di-tert-butyl peroxide, dicumyl peroxide, etc. From the viewpoint of the decomposition temperature, 2,2'-azobisisobutyronitrile or benzoyl peroxide is preferred. As the thermal polymerization initiator, one type may be used alone, or two or more types may be used in combination.

(Additives)

The additives include surface active agents, antioxidants (heat stabilizers), thixotropic agents, antifoaming agents, light stabilizers, anti-gelling agents, photosensitizers, resins, resin oligomers, carbon compounds, metal particles, metal oxide particles (but excluding the surface-modified metal oxide particles (A)), silane coupling agents, other organic compounds, etc.

(Solvent)

The curable composition of the present invention may contain a solvent. However, prior to curing the curable composition, it is preferred to remove the solvent.

As the solvent, it is possible to use any solvent so long as it is a solvent capable of dissolving the compounds (B) to (D) and the polymerization initiator (E), and a solvent having at least one of an ester structure, a ketone structure, a hydroxy group and an ether structure is preferred.

In the case of using a solvent in the present invention, the content of the solvent in the curable composition may suitably be adjusted depending on the desired viscosity, the coating properties, the desired thickness, etc.

(Content Proportions of the Respective Components in the Curable Composition)

The proportion of the surface-modified metal oxide particles (A) is from 20 to 45 mass %, preferably from 23 to 44 mass %, more preferably from 25 to 43 mass %, in 100 mass % of the total of all compounds having (meth)acryloyl groups (including the particles (A)). When the proportion is at least the lower limit value in the above range, the Abbe number of the cured product becomes to be high. When the proportion is at most the upper limit value in the above range, compatibility with other components will be good, the surface-modified metal oxide particles (A) tend to be easily uniformly dispersible in the curable composition, and transparency of the cured product will be excellent. Further, the cured product is less likely to become brittle, and crack resistance of the cured product will be excellent.

The proportion of the compound (B) is from 0.01 to 20 mass %, preferably from 0.1 to 15 mass %, more preferably from 0.3 to 10 mass %, in 100 mass % of the total of all compounds having (meth)acryloyl groups (including the particles (A)). When the proportion is at least the lower limit value in the above range, releasability of the cured product will be excellent. Further, it is possible to obtain an effect to increase the Abbe number of the cured product. When the proportion is at most the upper limit value in the above range, compatibility with other components will be good, and transparency of the cured product will be excellent.

The proportion of the compound (C) is from 10 to 50 mass %, preferably from 15 to 45 mass %, more preferably from 20 to 40 mass %, in 100 mass % of the total of all compounds having (meth)acryloyl groups (including the particles (A)). When the proportion is at least the lower limit value in the above range, flexibility of the cured product will be good, and crack resistance of the cured product will be excellent. When the proportion is at most the upper limit value in the above range, the Abbe number of the cured product becomes to be high. Further, compatibility with other components will be good, and transparency of the cured product will be excellent.

The proportion of the compound (D) is from 10 to 50 mass %, preferably from 15 to 48 mass %, more preferably from 20 to 46 mass %, to 100 mass % of the total of all compounds having (meth)acryloyl groups (including the particles (A)). When the proportion is at least the lower limit value in the above range, the compatibility of the respective components tends to be high, and transparency of the cured product will be excellent. When the proportion is at most the upper limit value in the above range, the Abbe number of the cured product becomes to be high.

The added amount of the polymerization initiator (E) is from 0.01 to 10 parts by mass, preferably from 0.1 to 7 parts by mass, more preferably from 0.3 to 5 parts by mass, to 100 parts by mass of the total of all compounds having (meth) acryloyl groups (including the particles (A)). When the added amount is at least the lower limit value in the above range, it is possible to easily form a cured product. When the added amount is at most the upper limit value in the above range, it is possible to uniformly mix it, whereby the polymerization initiator remaining in the cured product (E) will be reduced, and deterioration of physical properties of the cured product can be suppressed.

The total amount of other components such as additives, may be within a range not to impair the effects of the present invention, and is preferably at most 5 parts by mass, more preferably at most 3 parts by mass, to 100 parts by mass of the total of all compounds having (meth)acryloyl groups (including the particles (A)).

By the curable composition of the present invention as described above, for the following reasons, it is possible to obtain a cured product having a high Abbe number and being excellent in transparency, crack resistance and releasability.

The curable composition of the present invention contains specific surface-modified metal oxide particles (A), whereby it is possible to make the Abbe number of the cured product to be high. However, in order to make the Abbe number of the cured product to be high, it is necessary to increase the proportion of the surface-modified metal oxide particles (A), whereby the cured product becomes brittle, and crack resistance of the cured product becomes insufficient.

Therefore, by further incorporating a specific compound (B) having the Abbe number made to be high by having a fluorine atom, the proportion of of the surface-modified metal oxide particles (A) is suppressed to improve the crack resistance of the cured product. Further, at the same time, releasability of the cured product is improved. However, from the viewpoint of compatibility, there is a limit in reducing the proportion of the surface-modified metal oxide particles (A) by increasing the proportion of the compound (B), and therefore, still it cannot be said that crack resistance of the cured product is sufficient.

Therefore, by further incorporating a specific compound (C) having a urethane bond or —OCH$_2$CH(OH)CH$_2$— and having flexibility made to be high by making the molecular weight to be relatively high, flexibility is imparted to the cured product, and crack resistance of the cured product is improved to a large extent. However, the surface-modified metal oxide particles (A) are poor in compatibility with the compound (B) and the compound (C), whereby the respective components tend to be hardly dispersed uniformly in the curable composition, and transparency of the cured product is likely to be low.

Therefore, by further incorporating a specific compound (D) having deterioration of the Abbe number suppressed to minimum by having no unsaturated bond-containing ring structure that reduces the Abbe number, as a compatibilizer, compatibility of the respective components are improved, and transparency of the cured product is improved.

<Cured Product>

The cured product of the present invention is one obtained by curing the curable composition of the present invention. The cured product of the present invention may be formed on the surface of a substrate to obtain a laminate having a layer made of the cured product of the present invention and a layer made of the substrate.

The refractive index of the cured product to light having a wavelength of 589 nm is preferably at least 1.45, more preferably from 1.48 to 1.53. When the refractive index is within the above range, even when combined with another member such as glass, Fresnel reflection tends to be less likely to occur and loss of transmittance tends to be less.

The Abbe number obtained from the following formula (I) of the cured product is preferably at least 54, more preferably at least 56. When the Abbe number is at least the lower limit value in the above range, the chromatic aberration is less likely to occur. The higher the Abbe number, the better, and the upper limit is not particularly limited, but is about 70 in consideration of being an organic substance.

$$\nu_D = (n_D - 1)/(n_F - n_C) \tag{I}$$

wherein $\nu_D$ is the Abbe number, $n_D$ is the refractive index to light having a wavelength of 589 nm, $n_F$ is the refractive index to light having a wavelength 486 nm, and $n_C$ is the refractive index to light having a wavelength of 656 nm.

The transmittance of the cured product for light having a wavelength of 400 nm is preferably at least 89%, more preferably at least 90%. When the transmittance of the cured product for light having a wavelength of 400 nm is at least the above lower limit value, transparency of the cured product is more excellent.

The transmittance of the cured product for light having a wavelength of 400 nm is measured at 25° C. with respect to the cured product having a thickness of 100 μm by a method as described in JIS K7361; 1997 (ISO 13468-1; 1996) using light having a wavelength of 400 nm.

The water contact angle of the cured product will be an index for releasability of the cured product. The contact angle of the cured product is preferably at least 85 degrees, more preferably from 90 to 116 degrees. When the contact angle is at least the lower limit value in the above range, releasability of the cured product will be more excellent.

The water contact angle of the cured product is measured by the method described in JIS R3257; 1999.

(Method for Producing Cured Product)

The method for producing a cured product of the present invention may be a method (imprinting method) of curing a curable composition in a state where the curable composition is in contact with a mold having a reverse pattern of a fine pattern, to form a cured product having the fine pattern on its surface; or a method (injection molding method) of injecting a curable composition into a mold cavity, and curing the curable composition to form a cured product.

The curing method may be photocuring or thermal curing, and may be suitably selected depending on the polymerization initiator (E). As the curing method, from the viewpoint of efficiency for the production of a cured product, photocuring is preferred.

EXAMPLES

The present invention will be described in detail with reference to Examples, but the present invention is not limited thereto. Ex. 1 to 18 are Examples of the present invention, and Ex. 19 to 26 are Comparative Examples.

(Median Diameter of Surface-Modified Metal Oxide Particles (A))

The median diameter was obtained by using a particle size distribution measuring apparatus by a dynamic light scattering method (manufactured by Otsuka Electronics Co., Ltd., FPAR1000).

(Mass Average Molecular Weight of Compound (C))

The mass average molecular weight was measured by using the following device under the following conditions.

GPC system: HLC-8220GPC (manufactured by Tosoh Corporation),

Column: TSK guard Column Super MZ-L, TSK gel HZ4000, TSK gel HZ3000, TSK gel HZ2500, TSK gel HZ2000 (connected in this order for use), Column oven temperature: 40° C., solvent: tetrahydrofuran, flow rate: 0.35 mL/min, Standard sample: polystyrene.

(Viscosity of Compound (C) and Curable Composition)

The viscosity was obtained by measuring the dynamic viscoelasticity at a shear rate of $10 \text{ s}^{-1}$ at 25° C. by using a dynamic viscoelasticity measuring apparatus (manufactured by Anton Paar, Physica MCR301).

(Refractive Index of Curable Composition)

The refractive index was measured at temperature of 25° C. and at a wavelength of 589 nm by using an Abbe refractometer (manufactured by Atago Co., Ltd., multiwavelength Abbe refractometer DR-M2).

(Abbe Number of Curable Composition)

The Abbe number was calculated from the following formula (I) by measuring the respective refractive indices at wavelengths of 589 nm, 486 nm and 656 nm, at a temperature of 25° C. by the Abbe refractometer (the same as mentioned above).

$$\nu_D = (n_D - 1)/(n_F - n_C) \tag{I}$$

(Refractive Index of Cured Product)

A curable composition was applied to the surface of a silicon wafer, and ultraviolet rays were radiated from a high pressure mercury lamp at an exposure amount: 3,000 mJ/cm², to form a film-form cured product. The obtained cured product was subjected to heat treatment at 180° C. for 30 minutes to obtain a cured product for measuring the refractive index. By using a refractive index measurement device (manufactured by US Metricon Corporation, prism coupler: 2010/M), the refractive indices to lights having wavelengths of 473 nm, 594 nm and 658 nm, of the cured product, were measured, and by using Metricon Fit attached to the apparatus, the refractive index to light having a wavelength of 589 nm was calculated.

(Abbe Number of Cured Product)

By using the Metricon Fit attached to the above apparatus, the refractive indices at the respective wavelengths were calculated, and the Abbe number was calculated from the above formula (I).

(Cured Product for Evaluation)

A curable composition was applied to the surface of a glass substrate so that the thickness of the cured film became 100 μm, and ultraviolet rays were radiated from a high pressure mercury lamp at an exposure amount of 3,000 mJ/cm² to form a film-form cured product. The obtained cured product was subjected to heat-treatment at 180° C. for 30 minutes to obtain a cured product for evaluation.

(Transmittance of Cured Product)

The transmittance of the cured product for evaluation for light having a wavelength of 400 nm was measured by using a UV-visible-near-infrared spectrophotometer (manufactured by Shimadzu Corporation, Solid Spec-3700).

(Crack Resistance)

The cured product for evaluation was visually observed and evaluated under the following standards.

◯: No occurrence of cracks was observed.

x: Occurrence of cracks was observed after the heat treatment.

x x: Occurrence of cracks was observed at the time of curing by irradiation with ultraviolet rays, i.e. before the heat treatment.

(Water Contact Angle of Cured Product)

Using a contact angle meter (manufactured by Kyowa Interface Science Co., Ltd., portable contact angle meter PCA-1), the contact angle of pure water was measured 4 times, whereby an arithmetic mean value was obtained, and this was adopted as the water contact angle of the cured product. The water contact angle of the cured product will be an index for releasability of the cured product.

(Surface-Modified Metal Oxide Particles (A))

Particles (A-1) dispersion: Organosilica sol (manufactured by Nissan Chemical Industries, Ltd., MEK-AC-2140Z, a dispersion of surface-modified silica particles having (meth)acryloyl group-containing surface-modifying groups on the surface, represented by the formula (A1), dispersion medium: methyl ethyl ketone, $SiO_2$ concentration: 40 mass %, median diameter of surface-modified silica particles: 10.3 nm).

Particles (A-2) dispersion: A dispersion of surface-modified silica particles having (meth)acryloyl group-containing surface modifying groups and fluoroalkyl group-containing surface-modifying groups on the surface, prepared in accordance with Example 1 disclosed in JP-A-2014-234458.

(Compounds (B))

Compound (B-1): $CH_2$=$C(CH_3)C(O)O(CH_2)_2(CF_2)_6F$ (manufactured by Asahi Glass Company, Limited).

Compound (B-2): $CH_2$=$CHC(O)OCH_2CF_2(OCF_2CF_2)_2$ $OCF_2CH_2OC(O)CH$=$CH_2$ (manufactured by Shin-Nakamura Chemical Co., Ltd., NK Ester DA-F4EO).

(Compounds (C))

Compound (C1-1): Bi-functional urethane acrylate (manufactured by Shin-Nakamura Chemical Co., Ltd., NK Oligo UA-160TM, mass average molecular weight: 1,600, viscosity at 25° C.: 110,000 mPa·s).

Compound (C1-2): Bi-functional urethane acrylate (manufactured by Shin-Nakamura Chemical Co., Ltd., NK Oligo U-412A, mass average molecular weight: 4,700, viscosity at 25° C.: 13,500 mPa·s).

Compound (C1-3): Bi-functional urethane acrylate (manufactured by Shin-Nakamura Chemical Co., Ltd., NK Oligo UA-4200, mass average molecular weight: 1,300, viscosity at 25° C.: 2,000 mPa·s).

Compound (C1-4): Bi-functional urethane acrylate (manufactured by DAICEL-ALLNEX LTD., EBECRYL8807, mass average molecular weight: 1,000, viscosity at 25° C.: 265,000 mPa·s).

Compound (C2-1): Tri-functional epoxy acrylate (manufactured by Shin-Nakamura Chemical Co., Ltd., NK Oligo EA-5311, a compound obtained by adding acrylic acid to a reaction product of trimethylol propane and epichlorohydrin, mass average molecular weight: 15,000, viscosity at 25° C.: 3,000 mPa·s).

Compound (C2-2): Bi-functional epoxy acrylate (manufactured by DAICEL-ALLNEX LTD., EBECRYL3708, mass average molecular weight: 1,500, viscosity at 25° C.: 120,000 mPa·s).

Compound (C2-3): Bi-functional epoxy acrylate (manufactured by Toyo Chemicals Co. Ltd., MiramerEA2280, mass average molecular weight: 1,580, viscosity at 25° C.: 100,000 mPa·s).

(Compounds (D))

Compound (D2-1): tricyclodecane dimethanol diacrylate (manufactured by Shin-Nakamura Chemical Co., Ltd., NK EsterA-DCP).

Compound (D2-2): 1,6-hexanediol diacrylate (manufactured by Shin-Nakamura Chemical Co., Ltd., NK EsterA-HD-N).

Compound (D2-3): trimethylolpropane triacrylate (manufactured by Shin-Nakamura Chemical Co., Ltd., NK EsterA-TMPT).

Compound (D2-4): pentaerythritol triacrylate (tri-ester: 57%) (manufactured by Shin-Nakamura Chemical Co., Ltd., NK Ester A-TMM-3LM-N).

Compound (D1-1): 1-adamantyl methacrylate (manufactured by Osaka Organic Chemical Industry Ltd., ADMA).

Compound (D1-2): isobornyl acrylate (manufactured by Kyoeisha Chemical Co., Ltd., Light Acrylate IB-XA).

(Polymerization Initiator (E))

Polymerization initiator (E-1): A photo-radical polymerization initiator (Irgacure 184, trade name of BASF Japan).

Ex. 1

25.0 g of the particles (A-1) dispersion (nonvolatile content: 10.0 g), 0.25 g of the compound (B-1), 6.50 g of the compound (C1-1), 2.50 g of the compound (D2-1), 5.0 g of the compound (D2-2) and 0.75 g of the compound (D2-3) were mixed to become uniform, and the solvent was distilled off under reduced pressure at 40° C. To the obtained mixture, 0.75 g of the polymerization initiator (E-1) was mixed to obtain a curable composition in Ex. 1. The proportions of the respective components are shown in Table 1. The evaluation results are shown in Table 4.

Ex. 2 to 26

A curable composition was obtained in the same manner as in Ex. 1 except that the types and proportions of the surface-modified metal oxide particles (A), the compound (B), the compound (C) and the compound (D) were changed to the types and proportions as shown in Tables 1 to 3. The evaluation results are shown in Table 4.

TABLE 1

| | | Ex. | | | | | | | | |
|---|---|---|---|---|---|---|---|---|---|---|
| | | 1 | 2 | 3 | 4 | 5 | 6 | 7 | 8 | 9 |
| Mass % *[1] | Compound (A-1) | 40.0 | 31.0 | 29.8 | 34.7 | 35.6 | 43.1 | 33.5 | 33.3 | 33.4 |
| | Compound (A-2) | | | | | | | | | |
| | Compound (B-1) | 1.0 | 0.5 | 1.0 | 4.7 | 2.4 | 1.7 | 6.2 | 3.0 | 5.4 |
| | Compound (B-2) | | | | | | | | | |
| | Compound (C1-1) | 26.0 | 22.5 | 39.8 | 2.9 | 3.0 | 2.8 | | | |
| | Compound (C1-2) | | | | | | | | | |
| | Compound (C1-3) | | | | 25.4 | 26.0 | 19.3 | 26.1 | | |
| | Compound (C1-4) | | | | | | | | | |
| | Compound (C2-1) | | | | | | | | 29.5 | |
| | Compound (C2-2) | | | | | | | | | 11.6 |
| | Compound (C2-3) | | | | | | | | | |
| | Compound (D2-1) | 10.0 | 46.0 | 29.4 | 26.3 | 26.9 | 19.3 | 22.8 | 22.1 | 29.6 |
| | Compound (D2-2) | 20.0 | | | | | | | | |

TABLE 1-continued

|  |  | Ex. | | | | | | | | |
|---|---|---|---|---|---|---|---|---|---|---|
|  |  | 1 | 2 | 3 | 4 | 5 | 6 | 7 | 8 | 9 |
|  | Compound (D2-3) | 3.0 | | | | | | | | |
|  | Compound (D2-4) | | | | | | | | | |
|  | Compound (D1-1) | | | | | | | | | |
|  | Compound (D1-2) | | | | | 6.0 | 6.1 | 13.8 | 11.4 | 12.1 | 20.0 |
| Parts by mass *2 | Compound (E-1) | 3 | 3 | 3 | 3 | 3 | 3 | 3 | 3 | 3 |

*1 Proportion in 100 mass % of the total of (A), (B), (C) and (D).
*2 Parts by mass to 100 parts by mass of the total of (A), (B), (C) and (D).

TABLE 2

|  |  | Ex. | | | | | | | | |
|---|---|---|---|---|---|---|---|---|---|---|
|  |  | 10 | 11 | 12 | 13 | 14 | 15 | 16 | 17 | 18 |
| Mass % *1 | Compound (A-1) | 37.5 | 24.1 | 33.9 | 27.3 | 27.9 | 27.1 | 28.2 | 40.3 | 38.5 |
|  | Compound (A-2) | | | | | | | | | |
|  | Compound (B-1) | 2.4 | 1.0 | | | | | | | |
|  | Compound (B-2) | | | 8.5 | 9.1 | 2.5 | 9.4 | 2.5 | 2.8 | 2.7 |
|  | Compound (C1-1) | | | 32.9 | 36.4 | | | | | |
|  | Compound (C1-2) | | | | | 39.1 | | | | |
|  | Compound (C1-3) | | 45.3 | | | | 36.3 | | | |
|  | Compound (C1-4) | | | | | | | 36.9 | | |
|  | Compound (C2-1) | | | | | | | | 31.2 | 29.5 |
|  | Compound (C2-2) | | | | | | | | | |
|  | Compound (C2-3) | 13.0 | | | | | | | | |
|  | Compound (D2-1) | 28.1 | 29.6 | 24.7 | 27.2 | 30.5 | 27.2 | 32.4 | 25.7 | 24.3 |
|  | Compound (D2-2) | | | | | | | | | |
|  | Compound (D2-3) | | | | | | | | | 5.0 |
|  | Compound (D2-4) | | | | | | | | | |
|  | Compound (D1-1) | | | | | | | | | |
|  | Compound (D1-2) | 19.0 | | | | | | | | |
| Parts by mass *2 | Compound (E-1) | 3 | 3 | 3 | 3 | 3 | 3 | 3 | 3 | 3 |

*1 Proportion in 100 mass % of the total of (A), (B), (C) and (D).
*2 Parts by mass to 100 parts by mass of the total of (A), (B), (C) and (D).

TABLE 3

|  |  | Ex. | | | | | | | |
|---|---|---|---|---|---|---|---|---|---|
|  |  | 19 | 20 | 21 | 22 | 23 | 24 | 25 | 26 |
| Mass % *1 | Compound (A-1) | 31.0 | 47.3 | 50.0 | 50.0 | | 17.0 | 15.0 | |
|  | Compound (A-2) | | | | | | | | 50.0 |
|  | Compound (B-1) | 0.5 | 0.5 | | | 6.4 | 3.2 | 6.8 | |
|  | Compound (B-2) | | | | | | | | |
|  | Compound (C1-1) | | | | | 30.3 | 22.9 | 37.0 | |
|  | Compound (C1-2) | | | | | | | | |
|  | Compound (C1-3) | | | | | | | | |
|  | Compound (C1-4) | | | | | | | | |
|  | Compound (C2-1) | | | | | | | | |
|  | Compound (C2-2) | | | | | | | | |
|  | Compound (C2-3) | | | | | | | | |
|  | Compound (D2-1) | 46.0 | | | | | 23.6 | 38.2 | |
|  | Compound (D2-2) | | | | | | 24.1 | | |
|  | Compound (D2-3) | 22.5 | | 50.0 | 25.0 | 18.8 | 9.2 | 3.0 | 25.0 |
|  | Compound (D2-4) | | 52.2 | | | 44.5 | | | |
|  | Compound (D1-1) | | | | 25.0 | | | | 25.0 |
|  | Compound (D1-2) | | | | | | | | |
| Parts by mass *2 | Compound (E-1) | 3 | 3 | 3 | 3 | 3 | 3 | 3 | 3 |

*1 Proportion in 100 mass % of the total of (A), (B), (C) and (D).
*2 Parts by mass to 100 parts by mass of the total of (A), (B), (C) and (D).

TABLE 4

|  | Viscosity at 25° C. of curable composition (mPa·s) | Refractive index of curable composition (589 nm) | Refractive index of cured product (589 nm) | Abbe number of curable composition | Abbe number of cured product | Transmittance of cured product (400 nm) (%) | Crack resistance | Water contact angle (degrees) |
|---|---|---|---|---|---|---|---|---|
| Ex. 1 | 7,100 | 1.466 | 1.489 | 54.9 | 55.1 | 91.2 | ○ | 89 |
| Ex. 2 | 3,830 | 1.463 | 1.489 | 54.0 | 54.5 | 90.4 | ○ | 88 |
| Ex. 3 | 3,850 | 1.469 | 1.491 | 54.5 | 55.0 | 91.4 | ○ | 87 |
| Ex. 4 | 3,800 | 1.469 | 1.502 | 57.3 | 58.4 | 91.3 | ○ | 91 |
| Ex. 5 | 4,500 | 1.467 | 1.508 | 57.0 | 58.0 | 91.0 | ○ | 88 |
| Ex. 6 | 5,800 | 1.461 | 1.498 | 55.9 | 58.2 | 90.6 | ○ | 90 |
| Ex. 7 | 2,300 | 1.475 | 1.499 | 57.0 | 58.3 | 91.5 | ○ | 90 |
| Ex. 8 | 7,900 | 1.479 | 1.500 | 57.1 | 58.0 | 91.2 | ○ | 94 |
| Ex. 9 | 2,050 | 1.474 | 1.513 | 54.2 | 55.1 | 90.3 | ○ | 97 |
| Ex. 10 | 3,590 | 1.483 | 1.509 | 54.1 | 55.2 | 90.1 | ○ | 90 |
| Ex. 11 | 3,450 | 1.479 | 1.505 | 56.6 | 58.1 | 91.2 | ○ | 86 |
| Ex. 12 | 4,500 | 1.474 | 1.492 | 55.7 | 54.5 | 90.1 | ○ | 94 |
| Ex. 13 | 3,100 | 1.465 | 1.485 | 55.9 | 57.5 | 91.8 | ○ | 93 |
| Ex. 14 | 2,850 | 1.459 | 1.480 | 56.6 | 57.2 | 90.6 | ○ | 91 |
| Ex. 15 | 2,100 | 1.461 | 1.482 | 55.0 | 54.8 | 91.1 | ○ | 93 |
| Ex. 16 | 8,210 | 1.466 | 1.489 | 56.0 | 57.0 | 90.6 | ○ | 89 |
| Ex. 17 | 9,100 | 1.480 | 1.493 | 57.5 | 57.9 | 91.4 | ○ | 92 |
| Ex. 18 | 8,900 | 1.482 | 1.498 | 57.4 | 58.1 | 90.2 | ○ | 91 |
| Ex. 19 | 3,620 | 1.461 | 1.485 | 46.1 | 46.4 | — | x | 89 |
| Ex. 20 | 6,210 | 1.474 | 1.516 | 48.4 | — | — | xx | — |
| Ex. 21 | 10,100 | 1.468 | 1.503 | 48.9 | 49.2 | — | x | 65 |
| Ex. 22 | A curable composition was prepared, but underwent phase separation, and therefore measurements were impossible. | | | | | | | |
| Ex. 23 | 1,650 | 1.478 | 1.492 | 48.2 | 47.6 | 90.1 | ○ | 92 |
| Ex. 24 | 2,800 | 1.472 | 1.507 | 46.4 | 48.1 | 90.5 | ○ | 90 |
| Ex. 25 | 2,850 | 1.480 | 1.512 | 48.9 | 49.3 | 91.0 | ○ | 89 |
| Ex. 26 | A curable composition was prepared, but underwent phase separation, and therefore measurements were impossible. | | | | | | | |

In Ex. 1 to 18, the surface-modified metal oxide particles (A), the compound (B), the compound (C), the compound (D) and the polymerization initiator (E) were contained in the specific proportions, whereby the Abbe number was high, and the transparency, crack resistance and releasability were excellent.

In Ex. 19 to 21, the compound (C) was not contained, whereby the crack resistance was poor. In Ex. 21, the compound (B) was not contained, whereby the releasability was also poor.

In Ex. 22, compatibility of the compound (D1-1) and the surface-modified metal oxide particles (A) was poor, whereby phase separation was observed. In Ex. 23 to 25, the compound (A) was not contained or the compound (A) was less, whereby the Abbe number was low. In Ex. 26, compatibility of the compound (D1-1) and the surface-modified metal oxide particles (A) was poor, and phase separation was observed.

INDUSTRIAL APPLICABILITY

The curable composition of the present invention is useful as a material to be used for the production of an optical member (such as a lens, a prism, an anti-reflection film, an optical waveguide, a LED sealing material, etc.), a recording medium, a semiconductor device, etc.

This application is a continuation of PCT Application No. PCT/JP2016/086594, filed on Dec. 8, 2016, which is based upon and claims the benefit of priority from Japanese Patent Application No. 2015-240297 filed on Dec. 9, 2015 and Japanese Patent Application No. 2016-113687 filed on Jun. 7, 2016. The contents of those applications are incorporated herein by reference in their entireties.

What is claimed is:

1. A curable composition, comprising
surface-modified metal oxide particles (A), which are metal oxide particles having (meth)acryloyl group-containing surface-modifying groups on surface thereof,
a compound (B) which is a (meth)acryloyl group-containing compound comprising a fluorine atom,
a compound (C) which is a (meth)acryloyl group-containing compound comprising at least two (meth)acryloyl-containing groups and said (meth)acryloyl-containing group comprises a urethane bond or —OCH$_2$CH(OH)CH$_2$—, and having a mass average molecular weight of at least 1,000,
a compound (D) which is a (meth)acryloyl group-containing compound comprising at least one (meth)acryloyl-containing group and said (meth)acryloyl-containing group comprises no unsaturated bond-containing ring structure, and
a polymerization initiator (E),
wherein
per 100 mass % of a total mass of said particles (A), said component (B), said component (C), and said component (D), said particles (A) are from 20 to 45 mass %, said compound (B) is from 0.01 to 20 mass %, said compound (C) is from 10 to 50 mass %, and said compound (D) is from 10 to 50 mass %, and
said polymerization initiator (E) is from 0.01 to 10 parts by mass per 100 parts by mass of the total mass of said particles (A), said component (B), said component (C), and said component (D).

2. The curable composition according to claim 1, wherein the (meth)acryloyl group-containing surface modifying groups have a group represented by formula (A1),

$$CH_2=CR^1C(O)-X-(CH_2)_a-SiR^2_b(-*)_{3-b} \qquad (A1)$$

where * is a bond of Si, $R^1$ is a hydrogen atom or a methyl group, $R^2$ is a hydrogen atom or a $C_{1-4}$ hydrocarbon group, X is —O— or —NH—, a is an integer of from 2 to 7, and b is an integer of from 0 to 2, provided that when b is 2, the two $R^2$ are the same or different.

3. The curable composition according to claim 1, wherein the metal oxide particles of the surface-modified metal oxide particles (A) are silica particles.

4. The curable composition according to claim 1, wherein a median diameter of the surface-modified metal oxide particles (A) is from 1 to 1,000 nm.

5. The curable composition according to claim 1, wherein the compound (B) is a fluoro(meth)acrylate.

6. The curable composition according to claim 1, wherein the compound (C) is
   a compound (C1) having a urethane bond and having at least two (meth)acryloyl groups, or
   a compound (C2) having —OCH$_2$CH(OH)CH$_2$— and having at least two (meth)acryloyl groups.

7. The curable composition according to claim 6, wherein the compound (C) is the compound (C1), which is a compound represented by formula (C11):

   (C11)

where $R^{11}$ is a hydrogen atom or a methyl group, i is 1 or 2, J is a (i+1)-valent organic group, and Q is a k-valent organic group.

8. The curable composition according to claim 6, wherein the compound (C) is the compound (C2), which is a compound represented by formula (C21):

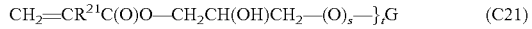
   (C21)

where $R^{21}$ is a hydrogen atom or a methyl group, s is 0 or 1, t is an integer of at least 2, and G is a t-valent organic group.

9. The curable composition according to claim 1, wherein the compound (D) is
   a compound (D1) having no unsaturated bond-containing ring structure and having one (meth)acryloyloxy group, or
   a compound (D2) having no unsaturated bond-containing ring structure and having at least two (meth)acryloyloxy groups.

10. The curable composition according to claim 9, wherein the compound (D) is the compound (D1), which is an acrylic acid ester or a methacrylic acid ester.

11. The curable composition according to claim 9, wherein the compound (D) is the compound (D2), which is a (meth)acrylate of a diol, a (meth)acrylate of a triol, or a tetraol (meth)acrylate.

12. The curable composition according to claim 1, wherein the polymerization initiator (E) is a photo-radical polymerization initiator.

13. The curable composition according to claim 1, further comprising
   a solvent containing at least one member selected from the group consisting of an ester, a ketone, a hydroxyl group, and an ether.

14. The curable composition according to claim 1, which has a viscosity at 25° C. of from 100 to 15,000 mPa·s.

15. A cured product, obtained by a process comprising curing the curable composition according to claim 1.

16. The curable composition according to claim 1, wherein a proportion of said particles (A) ranges from 27.1 to 43.1 mass % per 100 mass % of the total mass of said particles (A), said component (B), said component (C), and said component (D).

17. The curable composition according to claim 1, wherein a proportion of said compound (B) ranges from 1.7 to 9.4 mass % per 100 mass % of the total mass of said particles (A), said component (B), said component (C), and said component (D).

18. The curable composition according to claim 1, wherein a proportion of said compound (C) ranges from 11.6 to 45.3 mass % per 100 mass % of the total mass of said particles (A), said component (B), said component (C), and said component (D).

19. The curable composition according to claim 1, wherein a proportion of said compound (D) ranges from 24.7 to 49.6 mass % per 100 mass % of the total mass of said particles (A), said component (B), said component (C), and said component (D).

20. The curable composition according to claim 1, wherein said compound (D) has an alicylic structure.

21. The curable composition according to claim 1, wherein compound (C) does not contain a compound having a urethane bond.

* * * * *